US012655337B2

(12) United States Patent
Watanabe et al.

(10) Patent No.: US 12,655,337 B2
(45) Date of Patent: Jun. 16, 2026

(54) USE OF COMPOSITION AS REFRIGERANT, AND REFRIGERATION CYCLE APPARATUS

(71) Applicant: DAIKIN INDUSTRIES, LTD., Osaka (JP)

(72) Inventors: Yuka Watanabe, Osaka (JP); Tomoyuki Gotou, Osaka (JP); Yuuko Itou, Osaka (JP); Takashi Usui, Osaka (JP); Takashi Yoshimura, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 621 days.

(21) Appl. No.: 18/117,189

(22) Filed: Mar. 3, 2023

(65) Prior Publication Data

US 2023/0203357 A1      Jun. 29, 2023

Related U.S. Application Data

(63) Continuation of application No. PCT/JP2021/032300, filed on Sep. 2, 2021.

(30) Foreign Application Priority Data

Sep. 4, 2020      (JP) ................................. 2020-148670

(51) Int. Cl.
     *C09K 5/04*          (2006.01)
(52) U.S. Cl.
     CPC ........ *C09K 5/045* (2013.01); *C09K 2205/126* (2013.01); *C09K 2205/22* (2013.01)

(58) Field of Classification Search
     CPC ................................................... C07D 495/04
     See application file for complete search history.

(56) References Cited

U.S. PATENT DOCUMENTS

2017/0058173 A1*   3/2017   Fukushima ............ C09K 5/045
2021/0163381 A1    6/2021   Komatsu

FOREIGN PATENT DOCUMENTS

JP          2019-19985 A        2/2019
JP          2019-27655 A        2/2019
JP          2019-196312 A       11/2019
                (Continued)

OTHER PUBLICATIONS

Jiang et al. "Optimum compressor cylinder volume ratio for two-stage compression air source heat pump systems" International Journal of Refrigeration, 2016, 67, 77-89. (Year: 2016).*

(Continued)

*Primary Examiner* — Peter F Godenschwager
(74) *Attorney, Agent, or Firm* — Birch, Stewart, Kolasch & Birch, LLP

(57)          ABSTRACT

A pressure increase in a compressor is suppressed. Disclosed is a method that uses a composition as a refrigerant in a refrigerant circuit, in which the composition includes one or more compounds selected from the group consisting of ethylene-based fluoroolefins, 2,3,3,3-tetrafluoropropene, and 1,3,3,3-tetrafluoropropene, and in the refrigerant circuit, the total internal volume of a refrigerant pipe and a component that are connected to a compressor is greater than or equal to 0.7 times the internal volume of the compressor.

1 Claim, 4 Drawing Sheets

(56)     References Cited

FOREIGN PATENT DOCUMENTS

JP          2019-207054  A      12/2019

OTHER PUBLICATIONS

Extended European Search Report for European Application No.
21864405.2, dated Sep. 5, 2024.
International Search Report (PCT/ISA/210) issued in PCT/JP2021/
032300, dated Nov. 9, 2021.
International Preliminary Report on Patentability and English trans-
lation of the Written Opinion of the International Searching Author-
ity for International Application No. PCT/JP2021/032300, dated
Mar. 16, 2023.

* cited by examiner

USE OF COMPOSITION AS REFRIGERANT, AND REFRIGERATION CYCLE APPARATUS

CROSS REFERENCE TO RELATED APPLICATIONS

This application is a Continuation of PCT International Application No. PCT/JP2021/032300, filed on Sep. 2, 2021, which claims priority under 35 U.S.C. 119(a) to Patent Application No. JP 2020-148670, filed in Japan on Sep. 4, 2020, all of which are hereby expressly incorporated by reference into the present application.

TECHNICAL FIELD

The present disclosure relates to the use of a composition as a refrigerant, and a refrigeration cycle apparatus.

BACKGROUND ART

Conventionally, hydrofluoroolefins (HFO refrigerants) having lower global warming potential (hereinafter also simply referred to as GWP) than HFC refrigerants have attracted attention for refrigeration apparatuses. For example, 1,2-difluoroethylene (HFO-1132) is considered as a refrigerant with low GWP in Patent Literature 1 (Japanese Patent Laid-Open No. 2019-196312).

SUMMARY

The use of a composition as a refrigerant according to a first aspect is the use of a composition as a refrigerant in a refrigerant circuit. The refrigerant circuit includes a compressor, and a refrigerant pipe and a component that are connected to the compressor. The total internal volume of the refrigerant pipe and the component is greater than or equal to 0.7 times the internal volume of the compressor. The composition includes one or more compounds selected from the group consisting of ethylene-based fluoroolefins, 2,3,3,3-tetrafluoropropene (HFO-1234yf), and 1,3,3,3-tetrafluoropropene (HFO-1234ze).

DESCRIPTION OF EMBODIMENTS

Hereinafter, the use of a refrigerant in a refrigeration cycle apparatus and the refrigeration cycle apparatus according to the present disclosure will be specifically described with reference to examples. However, the following description is not intended to limit the present disclosure.

(1) Refrigeration Cycle Apparatus 1

A refrigeration cycle apparatus 1 is an apparatus for performing vapor-compression refrigeration cycles to process a heat load of a target space. For example, the refrigeration cycle apparatus 1 is an air-conditioning apparatus for conditioning air in a target space.

Figure 1:
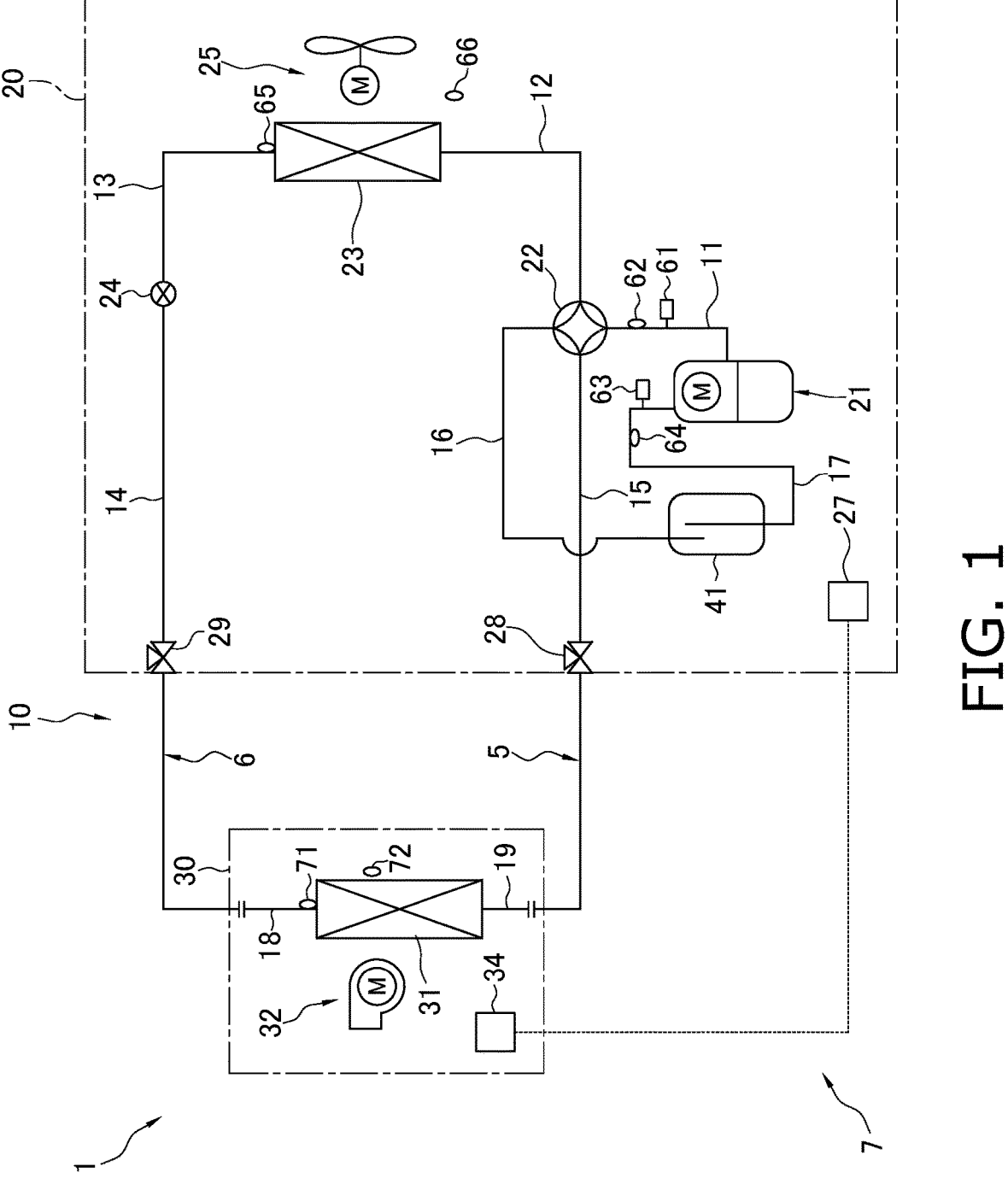
FIG. 1 is a schematic configuration diagram of a refrigeration cycle apparatus.
Figure 2:
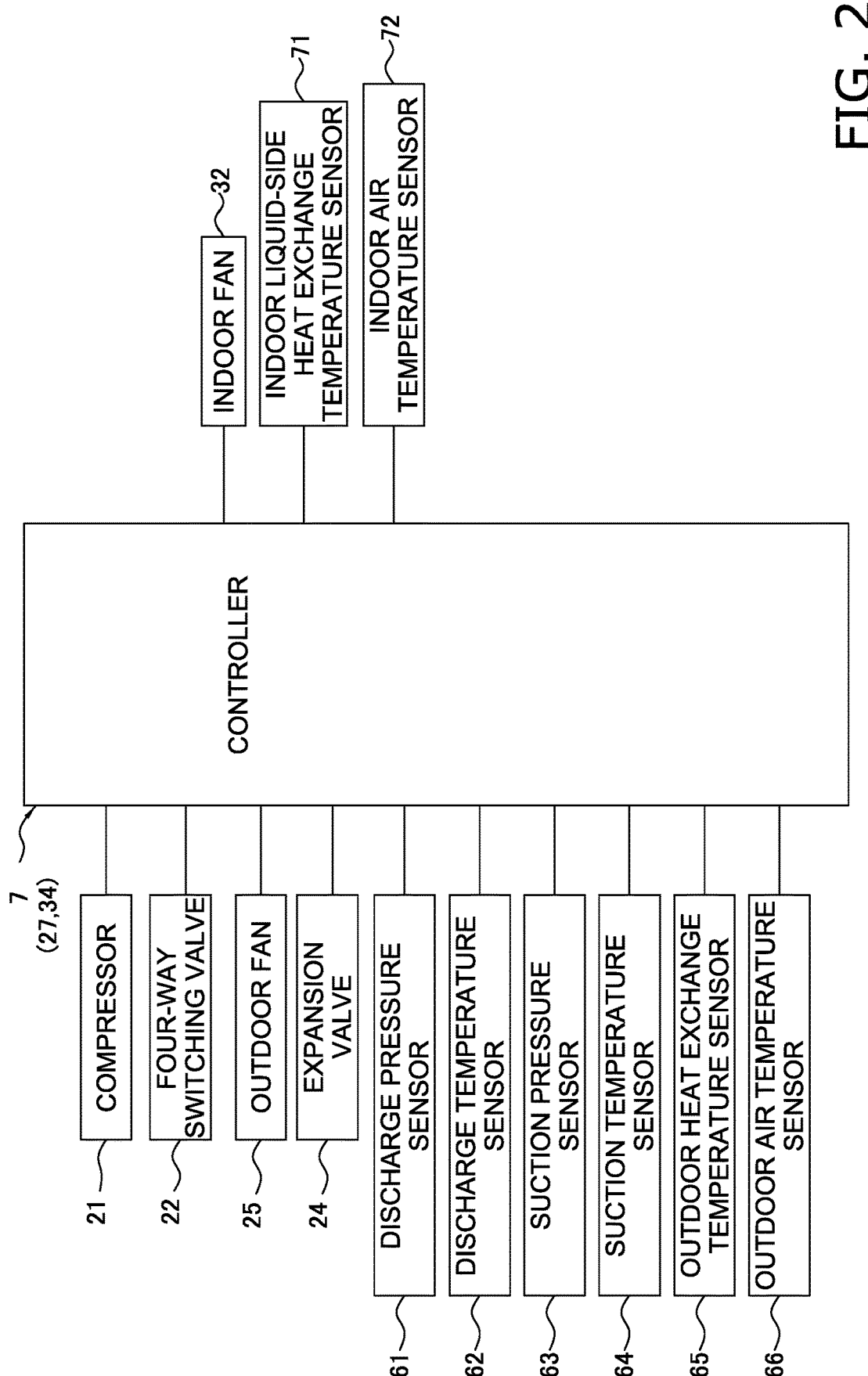
FIG. 2 is a block configuration diagram of the refrigeration cycle apparatus.

FIG. 1 is a schematic configuration diagram of the refrigeration cycle apparatus. FIG. 2 is a block configuration diagram of the refrigeration cycle apparatus.

The refrigeration cycle apparatus 1 mainly includes an outdoor unit 20; an indoor unit 30; a liquid-side refrigerant communication pipe 6 and a gas-side refrigerant communication pipe 5 each connecting the outdoor unit 20 and the indoor unit 30; a remote controller (not illustrated); and a controller 7 that controls the operation of the refrigeration cycle apparatus 1.

In the refrigeration cycle apparatus 1, refrigeration cycles are performed such that a refrigerant enclosed in a refrigerant circuit 10 is compressed, and is then cooled or condensed, and is then decompressed, and is then heated or evaporated, and is then compressed again. In the present embodiment, the refrigerant circuit 10 is filled with a refrigerant for performing vapor-compression refrigeration cycles.

(2) Refrigerant

Examples of the refrigerant filling the refrigerant circuit 10 include one or more compounds selected from the group consisting of ethylene-based fluoroolefins, 2,3,3,3-tetrafluoropropene (HFO-1234yf), and 1,3,3,3-tetrafluoropropene (HFO-1234ze). Note that regarding the burning velocity defined by the ISO 817, 1,3,3,3-tetrafluoropropene (HFO-1234ze) with a burning velocity of 1.2 cm/s is more preferable than 2,3,3,3-tetrafluoropropene (HFO-1234yf) with a burning velocity of 1.5 cm/s. Regarding the LFL (Lower Flammability Limit) defined by the ISO 817, 1,3,3,3-tetrafluoropropene (HFO-1234ze) with a LFL of 65,000 vol·ppm or 6.5% is more preferable than 2,3,3,3-tetrafluoropropene (HFO-1234yf) with a LFL of 62,000 vol·ppm or 6.2%. In particular, the refrigerant may include one or more compounds selected from the group consisting of 1,2-difluoroethylene (HFO-1132), 1,1-difluoroethylene (HFO-1132a), 1,1,2-trifluoroethylene (HFO-1123), monofluoroethylene (HFO-1141), chlorotrifluoroethylene (CFO-1113), and perfluoroolefins. Above all, the refrigerant preferably includes 1,2-difluoroethylene (HFO-1132) and/or 1,1,2-trifluoroethylene (HFO-1123).

Herein, examples of ethylene-based fluoroolefins include 1,2-difluoroethylene (HFO-1132), 1,1-difluoroethylene (HFO-1132a), 1,1,2-trifluoroethylene (HFO-1123), monofluoroethylene (HFO-1141), chlorotrifluoroethylene (CFO-1113), and perfluoroolefins. Examples of perfluoroolefins include tetrafluoroethylene (FO-1114).

Note that the refrigerant circuit 10 is also filled with refrigerator oil together with the aforementioned refrigerant.

(3) Outdoor Unit 20

The outdoor unit 20 is connected to the indoor unit 30 via the liquid-side refrigerant communication pipe 6 and the gas-side refrigerant communication pipe 5, and consists part of the refrigerant circuit 10. The outdoor unit 20 mainly includes a compressor 21, a four-way switching valve 22, an outdoor heat exchanger 23, an expansion valve 24, an outdoor fan 25, a receiver 41, a gas-side shut-off valve 28, a liquid-side shut-off valve 29, and a first refrigerant pipe 11 to a seventh refrigerant pipe 17.

The compressor 21 is a device that compresses a low-pressure refrigerant in a refrigeration cycle up to a high pressure. Herein, the compressor 21 may be a hermetic compressor in which a rotary-type or scroll-type positive-displacement compression element is rotationally driven by a compressor motor. In the present embodiment, a rotary compressor is used. The compressor motor is used to change the volume, and its operating frequency can be controlled with an inverter. The seventh refrigerant pipe 17, which is a suction pipe, is connected to the suction side of the compressor 21. The first refrigerant pipe 11, which is a discharge pipe, is connected to the discharge side of the compressor 21.

The four-way switching valve 22 is a valve that switches a flow channel as the movement of its valve element (not illustrated) is controlled, and is a valve that switches the refrigerant circuit 10 between a cooling connection state and a heating connection state. Specifically, in the cooling connection state, the four-way switching valve 22 is switched to a state of connecting the first refrigerant pipe 11 connected to the discharge side of the compressor 21 and the second refrigerant pipe 12 connected to the outdoor heat exchanger 23, and connecting the seventh refrigerant pipe 17 connected to the suction side of the compressor 21, the receiver 41, the sixth refrigerant pipe 16, and the fifth refrigerant pipe 15 connected to the gas-side shut-off valve 28. Meanwhile, in the heating connection state, the four-way switching valve 22 is switched to a state of connecting the first refrigerant pipe 11 connected to the discharge side of the compressor 21 and the fifth refrigerant pipe 15 connected to the gas-side shut-off valve 28, and connecting the seventh refrigerant pipe 17 connected to the suction side of the compressor 21, the receiver 41, the sixth refrigerant pipe 16, and the second refrigerant pipe 12 connected to the outdoor heat exchanger 23.

The outdoor heat exchanger 23 is a heat exchanger that functions as a radiator or a condenser for a high-pressure refrigerant in a refrigeration cycle during the cooling operation, and functions as an evaporator for a low-pressure refrigerant in a refrigeration cycle during the heating operation. The gas-side end portion of the outdoor heat exchanger 23 is connected to the four-way switching valve 22 via the second refrigerant pipe 12. The liquid-side end portion of the outdoor heat exchanger 23 is connected to the expansion valve 24 via the third refrigerant pipe 13.

The expansion valve 24 is provided between the liquid-side outlet of the outdoor heat exchanger 23 and the liquid-side shut-off valve 29 in the refrigerant circuit 10. The expansion valve 24 is a motor-operated expansion valve with an opening degree that is adjustable as the movement of its valve element (not illustrated) relative to a valve seat (not illustrated) is controlled. The expansion valve 24 and the liquid-side shut-off valve 29 are connected via the fourth refrigerant pipe 14.

The outdoor fan 25 produces an air flow for causing outdoor air to be sucked into the outdoor unit 20, and causing the sucked air to exchange heat with a refrigerant in the outdoor heat exchanger 23, and then causing the air to be discharged to the outside. The outdoor fan 25 is rotationally driven by an outdoor fan motor.

The receiver 41 is a refrigerant container that is provided between the suction side of the compressor 21 and one of connection ports of the four-way switching valve 22, and that can store an excess refrigerant in the refrigerant circuit 10 as a liquid refrigerant. The inlet side of the receiver 41 is connected to the four-way switching valve 22 via the sixth refrigerant pipe 16. The outlet side of the receiver 41 is connected to the suction side of the compressor 21 via the seventh refrigerant pipe 17.

The liquid-side shut-off valve 29 is a manual valve disposed at a portion of the outdoor unit 20 connected to the liquid-side refrigerant communication pipe 6.

The gas-side shut-off valve 28 is a manual valve disposed at a portion of the outdoor unit 20 connected to the gas-side refrigerant communication pipe 5.

The outdoor unit 20 includes an outdoor unit controller 27 that controls the operation of each portion consisting the outdoor unit 20. The outdoor unit controller 27 has a microcomputer including a CPU and a memory, for example. The outdoor unit controller 27 is connected to an indoor unit controller 34 of each indoor unit 30 via a communication line, and transmits and receives control signals, for example.

The outdoor unit 20 is provided with a discharge pressure sensor 61, a discharge temperature sensor 62, a suction pressure sensor 63, a suction temperature sensor 64, an outdoor heat exchange temperature sensor 65, and an outdoor air temperature sensor 66, for example. Each of such sensors is electrically connected to the outdoor unit controller 27, and transmits a detection signal to the outdoor unit controller 27. The discharge pressure sensor 61 detects the pressure of a refrigerant flowing through the first refrigerant pipe 11 that is the discharge pipe connecting the discharge side of the compressor 21 and one of the connection ports of the four-way switching valve 22. The discharge temperature sensor 62 detects the temperature of the refrigerant flowing through the first refrigerant pipe 11 that is the discharge pipe. The suction pressure sensor 63 detects the pressure of a refrigerant flowing through the seventh refrigerant pipe 17 that is the suction pipe connecting the suction side of the compressor 21 and the receiver 41. The suction temperature sensor 64 detects the temperature of the refrigerant flowing through the seventh refrigerant pipe 17 that is the suction pipe. The outdoor heat exchange temperature sensor 65 detects the temperature of a refrigerant flowing through the liquid-side outlet of the outdoor heat exchanger 23 on the side opposite to the side connecting to the four-way switching valve 22. The outdoor air temperature sensor 66 detects the temperature of outdoor air before it passes through the outdoor heat exchanger 23.

(4) Indoor Unit 30

The indoor unit 30 is disposed on an indoor wall surface or ceiling as a target space, for example. The indoor unit 30 is connected to the outdoor unit 20 via the liquid-side refrigerant communication pipe 6 and the gas-side refrigerant communication pipe 5, and consists part of the refrigerant circuit 10.

The indoor unit 30 includes an indoor heat exchanger 31, an eighth refrigerant pipe 18, a ninth refrigerant pipe 19, and an indoor fan 32.

The indoor heat exchanger 31 is connected at its liquid-side end to the liquid-side refrigerant communication pipe 6 via the eighth refrigerant pipe 18, and is connected at its gas-side end to the gas-side refrigerant communication pipe 5 via the ninth refrigerant pipe 19. The indoor heat exchanger 31 is a heat exchanger that functions as an evaporator for a low-pressure refrigerant in a refrigeration cycle during the cooling operation, and functions as a condenser for a high-pressure refrigerant in a refrigeration cycle during the heating operation.

The indoor fan 32 produces an air flow for causing indoor air to be sucked into the indoor unit 30, and causing the sucked air to exchange heat with a refrigerant in the indoor heat exchanger 31, and then causing the air to be discharged to the outside. The indoor fan 32 is rotationally driven by an indoor fan motor.

The indoor unit 30 includes the indoor unit controller 34 that controls the operation of each unit consisting the indoor unit 30. The indoor unit controller 34 has a microcomputer including a CPU and a memory, for example. The indoor unit controller 34 is connected to the outdoor unit controller 27 via the communication line, and transmits and receives control signals, for example.

The indoor unit 30 is provided with an indoor liquid-side heat exchange temperature sensor 71 and an indoor air temperature sensor 72, for example. Each of such sensors is electrically connected to the indoor unit controller 34, and transmits a detection signal to the indoor unit controller 34. The indoor liquid-side heat exchange temperature sensor 71 detects the temperature of a refrigerant flowing through the liquid-refrigerant-side outlet of the indoor heat exchanger 31. The indoor air temperature sensor 72 detects the temperature of indoor air before it passes through the indoor heat exchanger 31.

(5) Controller 7

In the refrigeration cycle apparatus 1, the outdoor unit controller 27 and the indoor unit controller 34 are connected via the communication line, thus consisting the controller 7 that controls the operation of the refrigeration cycle apparatus 1.

The controller 7 mainly includes a CPU (central processing unit) and a memory, such as ROM and RAM. Note that various processes and control performed by the controller 7 are implemented as the portions, which are included in the outdoor unit controller 27 and/or the indoor unit controller 34, function in an integrated manner.

(6) Operation Modes

The refrigeration cycle apparatus 1 can execute at least a cooling operation mode and a heating operation mode.

The controller 7 determines whether the instruction indicates the cooling operation mode or the heating operation mode, based on an instruction received from the remote controller or the like, and executes the mode.

In the cooling operation mode, the operating frequency of the compressor 21 is controlled to control the volume so that the evaporating temperature of the refrigerant in the refrigerant circuit 10 reaches a target evaporating temperature, for example.

The gaseous refrigerant discharged from the compressor 21 passes through the first refrigerant pipe 11, the four-way switching valve 22, and the second refrigerant pipe 12, and is then condensed in the outdoor heat exchanger 23. The refrigerant that has flowed through the outdoor heat exchanger 23 passes through the third refrigerant pipe 13, and is then decompressed while passing through the expansion valve 24.

The refrigerant decompressed in the expansion valve 24 passes through the fourth refrigerant pipe 14, and then flows through the liquid-side refrigerant communication pipe 6 via the liquid-side shut-off valve 29, and is further sent to the indoor unit 30. After that, the refrigerant passes through the eighth refrigerant pipe 18, and then evaporates in the indoor heat exchanger 31, and further passes through the ninth refrigerant pipe 19 to flow into the gas-side refrigerant communication pipe 5. The refrigerant that has flowed through the gas-side refrigerant communication pipe 5 is sucked into the compressor 21 again via the gas-side shut-off valve 28, the fifth refrigerant pipe 15, the four-way switching valve 22, the sixth refrigerant pipe 16, the receiver 41, and the seventh refrigerant pipe 17.

In the heating operation mode, the operating frequency of the compressor 21 is controlled to control the volume so that the condensation temperature of the refrigerant in the refrigerant circuit 10 reaches a target condensation temperature, for example.

The gaseous refrigerant discharged from the compressor 21 flows through the first refrigerant pipe 11, the four-way switching valve 22, the fifth refrigerant pipe 15, and the gas-side refrigerant communication pipe 5, and is then sent to the indoor unit 30. After that, the refrigerant passes through the ninth refrigerant pipe 19, and then flows into the gas-side end of the indoor heat exchanger 31 so that the refrigerant is condensed or is allowed to radiate heat in the indoor heat exchanger 31. The refrigerant, which has been condensed or has been allowed to radiate heat in the indoor heat exchanger 31, passes through the eighth refrigerant pipe 18, and then flows through the liquid-side refrigerant communication pipe 6 to flow into the outdoor unit 20.

The refrigerant that has passed through the liquid-side shut-off valve 29 of the outdoor unit 20 passes through the fourth refrigerant pipe 14, and is then decompressed in the expansion valve 24. The refrigerant decompressed in the expansion valve 24 passes through the third refrigerant pipe 13, and then evaporates in the outdoor heat exchanger 23 so as to be sucked into the compressor 21 again via the second refrigerant pipe 12, the four-way switching valve 22, the sixth refrigerant pipe 16, the receiver 41, and the seventh refrigerant pipe 17.

(7) Relationship of Volumes

The refrigerant circuit 10 of the refrigeration cycle apparatus 1 of the present embodiment is configured such that the total internal volume of the first refrigerant pipe 11, the four-way switching valve 22, the second refrigerant pipe 12, the outdoor heat exchanger 23, the third refrigerant pipe 13, and the expansion valve 24 is greater than or equal to 0.7 times the internal volume of the compressor 21.

Further, the refrigerant circuit 10 of the refrigeration cycle apparatus 1 of the present embodiment is configured such that the total internal volume of the first refrigerant pipe 11, the four-way switching valve 22, the fifth refrigerant pipe 15, the gas-side refrigerant communication pipe 5, the ninth refrigerant pipe 19, the indoor heat exchanger 31, the eighth refrigerant pipe 18, the liquid-side refrigerant communication pipe 6, the fourth refrigerant pipe 14, and the expansion valve 24 is greater than or equal to 0.7 times the internal volume of the compressor 21.

Herein, the internal volume may be the volume of a refrigerant that can fill the internal space under a predetermined temperature condition in the non-operating state.

(8) Features of Embodiment

In the refrigeration cycle apparatus 1 of the present embodiment, a refrigerant that may undergo a disproportionation reaction upon satisfying a predetermined condition is used. In particular, in the refrigerant circuit 10, a disproportionation reaction is highly likely to occur in the compressor 21 where a refrigerant is likely to be in a high-temperature, high-pressure state and electric energy may be generated around an electrical contact or frictional heat may be generated around a sliding portion. When a disproportionation reaction occurs in the compressor 21, pressure in the compressor 21 may suddenly increase. Such pressure that suddenly increases in the compressor 21 may exceed four times the designed pressure that is determined through a test of checking the designed strength of the compressor (for example, see JIS B 8240:2015: Construction of Pressure Vessels for Refrigeration "8 Check of Designed Strength of Pressure Vessel with Complex Construction"). Thus, the reliability of the compressor 21 is questioned.

In contrast, the inventors of the present application have confirmed from the results of a test described below that when the total internal volume of a refrigerant pipe 70 and a second pressure-resistant container 60 that are connected to a first pressure-resistant container 50 is greater than or equal to 0.7 times the internal volume of the first pressure-resistant container 50 in which a disproportionation reaction is caused to occur, it is possible to suppress a sudden increase in pressure in the first pressure-resistant container 50 even if the disproportionation reaction has occurred therein.

Figure 3:
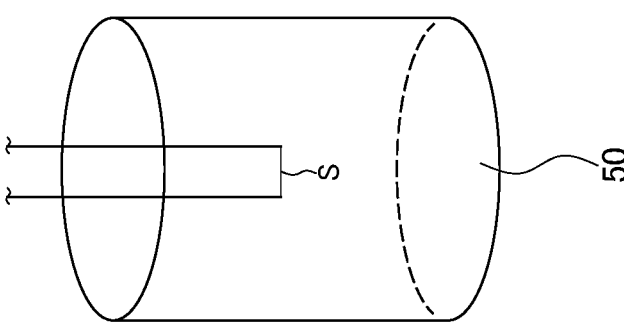
FIG. 3 is a schematic view illustrating a test device used in Test Example 1 related to a pressure increase resulting from a disproportionation reaction.
Figure 4:
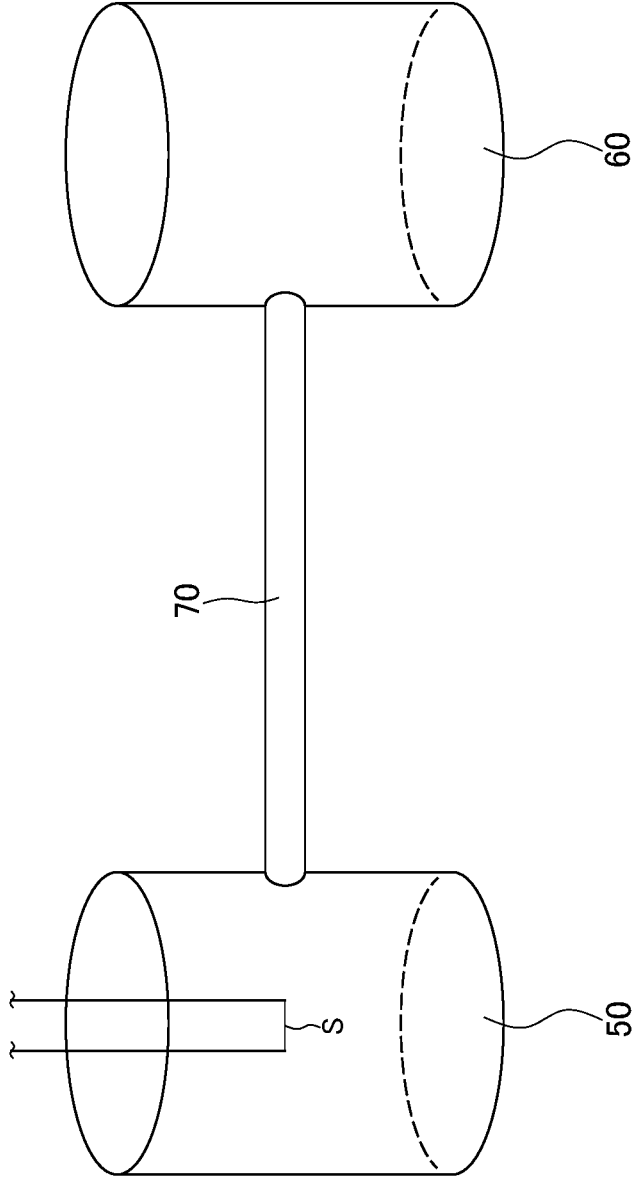
FIG. 4 is a schematic view illustrating a test device used in Test Examples 2 to 6 related to a pressure increase resulting from a disproportionation reaction.

Specifically, the test was performed with a test device illustrated in FIG. 3 and a test device illustrated in FIG. 4.

For the test device of FIG. 3, the first pressure-resistant container 50 made of SUS and having a cylindrical internal space was used. The internal volume of the first pressure-resistant container 50 was 35 cc. The first pressure-resistant container 50 was provided with a temperature sensor for detecting the temperature of a refrigerant in the container, and a pressure sensor for detecting the pressure of the refrigerant in the container. An ignition source S, which is a platinum wire provided to connect two electrodes, was provided in the center of the internal space of the pressure-resistant container 50. In Test Example 1, the test device of FIG. 3 was used, and the first pressure-resistant container 50 was filled with 1,2-difluoroethylene (HFO-1132(E)) as a refrigerant, and the refrigerant temperature was set to 150° C. while the refrigerant pressure was set to 1.2 MPa so that a disproportionation reaction was caused to occur with the ignition source S.

As the test device of FIG. 4, the first pressure-resistant container 50, which is the same as the one used for the test device of FIG. 3, was used, and a test device including the first pressure-resistant container 50 and the second pressure-resistant container 60 both connected by the refrigerant pipe 70 was used. Each of the first pressure-resistant container 50 and the second pressure-resistant container 60 was a container made of SUS and has a cylindrical internal space. In the test, each of the first pressure-resistant container 50 and the second pressure-resistant container 60 was provided with a temperature sensor for detecting the temperature of a refrigerant in the container, and a pressure sensor for detecting the pressure of the refrigerant in the container. As the refrigerant pipe 70, a refrigerant pipe made of SUS, having a length of 20 cm and a pipe diameter of ¼ inch, and extending from the peripheral face of the first pressure-resistant container 50 to the peripheral face of the second pressure-resistant container 60 was used. As in the test device of FIG. 3, an ignition source S, which was a platinum wire provided to connect two electrodes, was provided in the center of the internal space of the pressure-resistant container 50. In the test device of FIG. 4, the first pressure-resistant container 50, the second pressure-resistant container 60, and the refrigerant pipe 70 were filled with 1,2-difluoroethylene (HFO-1132(E)) as a refrigerant, and the refrigerant temperature was set to 150° C. while the refrigerant pressure was set to 1.2 MPa so that a disproportionation reaction was caused to occur with the ignition source S. In each of Test Examples 2 to 6, the test device of FIG. 4 was used, and the internal volume of the first pressure-resistant container 50 was set to 35 cc while the internal volume of the second pressure-resistant container 60 was changed so that a disproportionation reaction was caused to occur. Then, differences in the pressure increase in the first pressure-resistant container 50 were observed. The results of the test examples are indicated below.

In the following table, the "Total Volume" indicates the sum of the internal volume of the first pressure-resistant container and the internal volume of the second pressure-resistant container. In addition, the "Internal Volume Ratio" indicates a value obtained by dividing the internal volume of the second pressure-resistant container by the internal volume of the first pressure-resistant container.

The "Maximum Pressure" as the "Theoretical Value" indicates the maximum value of pressure that is estimated to be detected with the pressure sensor in the first pressure-resistant container when it is assumed that the refrigerant in the first pressure-resistant container has entirely decomposed through a disproportionation reaction, and thus a disproportionation reaction of the refrigerant has not occurred in the second pressure-resistant container. In Test Example 1 in which the refrigerant in the first pressure-resistant container has entirely decomposed through a disproportionation reaction, pressure (1.2 MPa) in the first pressure-resistant container prior to the occurrence of the disproportionation reaction has increased to 9.6 MPa. This demonstrates that pressure in the first pressure-resistant container has increased 8.0 times (9.6 MPa/1.2 MPa) due to the decomposition of the refrigerant through the disproportionation reaction. Thus, the "Maximum Pressure" as the "Theoretical Value" was obtained by calculating (pressure in the first pressure-resistant container prior to the occurrence of the disproportionation reaction×the decomposition rate of the refrigerant×8.0)+(pressure in the first pressure-resistant container prior to the occurrence of the disproportionation reaction×(100−the decomposition rate)). The "Pressure Change Rate" as the "Theoretical Value" indicates the value obtained by dividing the "Maximum Pressure" as the "Theoretical Value" by pressure in the first pressure-resistant container before the disproportionation reaction was caused to occur.

The "Maximum Pressure" as the "Actual Measurement Value" indicates the maximum value of pressure detected with the pressure sensor in the first pressure-resistant container when a disproportionation reaction was caused to occur. The "Pressure Change Rate" as the "Actual Measurement Value" indicates the value obtained by dividing the "Maximum Pressure" as the "Actual Measurement Value" by pressure in the first pressure-resistant container before the disproportionation reaction was caused to occur.

TABLE 1

| | Experimental Conditions | | | | Theoretical Value | | | Actual Measurement Value | |
|---|---|---|---|---|---|---|---|---|---|
| | Internal Volume (cc) of First Pressure-Resistant Container | Internal Volume (cc) of Second Pressure-Resistant Container | Total Volume (cc) | Internal Volume Ratio (Second/First) | Decomposition Rate (%) | Maximum Pressure (MPa) | Pressure Change Rate | Maximum Pressure (MPa) | Pressure Change Rate |
| Test Example 1 | 35.0 | 0 | 35.0 | 0 | 100 | 9.6 | 8.0 | 9.6 | 8.0 |
| Test Example 2 | 35.0 | 17.5 | 52.5 | 0.5 | 67 | 6.8 | 5.7 | 5.8 | 4.8 |
| Test Example 3 | 35.0 | 24.5 | 59.5 | 0.7 | 59 | 6.1 | 5.1 | 4.8 | 4.0 |
| Test Example 4 | 35.0 | 35.0 | 70.0 | 1.0 | 50 | 5.4 | 4.5 | 3.4 | 2.9 |
| Test Example 5 | 35.0 | 100.0 | 135.0 | 2.86 | 26 | 3.4 | 2.8 | 2.5 | 2.0 |
| Test Example 6 | 35.0 | 500.0 | 535.0 | 14.29 | 7 | 1.7 | 1.5 | 1.4 | 1.2 |

The foregoing test results demonstrate that the greater the proportion of the internal volume of the second pressure-resistant container 60 to the internal volume of the first pressure-resistant container 50, the more likely the degree of pressure increase is to be suppressed even when a disproportionation reaction has occurred in the first pressure-resistant container 50. In particular, if the internal volume of the second pressure-resistant container 60 is greater than or equal to 0.7 times the internal volume of the first pressure-resistant container 50, the pressure change rate when a disproportionation reaction has occurred can be suppressed to less than or equal to 4.0, which is within the range of the test of checking the designed strength of the compressor (i.e., a pressure of 4 times the designed strength). This demonstrates that the reliability of the compressor can be ensured. When the "Pressure Change Rate" of the "Theoretical Value" and the "Pressure Change Rate" of the "Actual Measurement Value" in Table 1 are compared, the actual measurement value indicates a more suppressed pressure increase. This demonstrates that connecting the second pressure-resistant container 60 to the first pressure-resistant container 50 via the refrigerant pipe 70 can suppress a pressure increase to less than the estimated value.

The refrigeration cycle apparatus 1 of the present embodiment is configured such that the total internal volume of the first refrigerant pipe 11, the four-way switching valve 22, the second refrigerant pipe 12, the outdoor heat exchanger 23, the third refrigerant pipe 13, and the expansion valve 24 is greater than or equal to 0.7 times the internal volume of the compressor 21. Thus, even when a disproportionation reaction has occurred in the compressor 21 during the cooling operation, a pressure increase in the compressor 21 can be suppressed to less than or equal to 4.0 times. In addition, the refrigeration cycle apparatus 1 of the present embodiment is configured such that the total internal volume of the first refrigerant pipe 11, the four-way switching valve 22, the fifth refrigerant pipe 15, the gas-side refrigerant communication pipe 5, the ninth refrigerant pipe 19, the indoor heat exchanger 31, the eighth refrigerant pipe 18, the liquid-side refrigerant communication pipe 6, the fourth refrigerant pipe 14, and the expansion valve 24 is greater than or equal to 0.7 times the internal volume of the compressor 21. Thus, even when a disproportionation reaction has occurred in the compressor 21 during the heating operation, a pressure increase in the compressor 21 can be suppressed to less than or equal to 4.0 times.

Accordingly, it is possible to ensure the reliability of the compressor 21 in the refrigeration cycle apparatus 1 for which a refrigerant that may undergo a disproportionation reaction is used.

Since a pressure increase in the compressor 21 when a disproportionation reaction has occurred therein is suppressed, it is also possible to suppress a sudden pressure increase in the first refrigerant pipe 11, the four-way switching valve 22, the second refrigerant pipe 12, the outdoor heat exchanger 23, the third refrigerant pipe 13, the expansion valve 24, the fifth refrigerant pipe 15, the gas-side refrigerant communication pipe 5, the ninth refrigerant pipe 19, the indoor heat exchanger 31, the eighth refrigerant pipe 18, the liquid-side refrigerant communication pipe 6, and the fourth refrigerant pipe 14 that are connected to the discharge side of the compressor 21. Accordingly, the reliability of such pipes and components can be increased. Further, pipes and components with low pressure resistance can be used for such pipes and components.

(9) Other Embodiments

(9-1) Another Embodiment A

The foregoing embodiment has exemplarily illustrated the refrigerant circuit 10 in which the total internal volume of the first refrigerant pipe 11, the four-way switching valve 22, the second refrigerant pipe 12, the outdoor heat exchanger 23, the third refrigerant pipe 13, and the expansion valve 24 that are connected to the discharge side of the compressor 21 is greater than or equal to 0.7 times the internal volume of the compressor 21.

In contrast, for example, the refrigerant circuit 10 may be configured such that the total internal volume of the first refrigerant pipe 11, the four-way switching valve 22, the second refrigerant pipe 12, and the outdoor heat exchanger 23 that are connected to the discharge side of the compressor 21 is greater than or equal to 0.7 times the internal volume of the compressor 21.

(9-2) Another Embodiment B

The foregoing embodiment has exemplarily illustrated the refrigerant circuit 10 in which the total internal volume of the first refrigerant pipe 11, the four-way switching valve 22, the fifth refrigerant pipe 15, the gas-side refrigerant communication pipe 5, the ninth refrigerant pipe 19, the indoor heat exchanger 31, the eighth refrigerant pipe 18, the liquid-side refrigerant communication pipe 6, the fourth refrigerant pipe 14, and the expansion valve 24 that are connected to the discharge side of the compressor 21 is greater than or equal to 0.7 times the internal volume of the compressor 21.

In contrast, for example, the refrigerant circuit 10 may be configured such that the total internal volume of the first refrigerant pipe 11, the four-way switching valve 22, the fifth refrigerant pipe 15, the gas-side refrigerant communication pipe 5, the ninth refrigerant pipe 19, and the indoor heat exchanger 31 that are connected to the discharge side of the compressor 21 is greater than or equal to 0.7 times the internal volume of the compressor 21.

(9-3) Another Embodiment C

The foregoing embodiment has exemplarily illustrated the refrigerant circuit 10 in which the total internal volume of the refrigerant pipes, the heat exchanger, and the like that are connected to the discharge side of the compressor 21 is greater than or equal to 0.7 times the internal volume of the compressor 21.

In contrast, for example, the refrigerant circuit 10 may be configured such that the total internal volume of the refrigerant pipes, the heat exchanger, and the like that are connected to the suction side of the compressor 21 is greater than or equal to 0.7 times the internal volume of the compressor 21.

Specifically, the refrigerant circuit 10 may be configured such that when the refrigerant circuit 10 is in the cooling connection state, the total internal volume of the seventh refrigerant pipe 17, the receiver 41, the sixth refrigerant pipe 16, the four-way switching valve 22, the fifth refrigerant pipe 15, the gas-side refrigerant communication pipe 5, the ninth refrigerant pipe 19, the indoor heat exchanger 31, the eighth refrigerant pipe 18, the liquid-side refrigerant communication pipe 6, the fourth refrigerant pipe 14, and the expansion valve 24 is greater than or equal to 0.7 times the internal volume of the compressor 21, and when the refrigerant circuit 10 is in the heating connection state, the total internal volume of the seventh refrigerant pipe 17, the receiver 41, the sixth refrigerant pipe 16, the four-way switching valve 22, the second refrigerant pipe 12, the outdoor heat exchanger 23, the third refrigerant pipe 13, and the expansion valve 24 is greater than or equal to 0.7 times the internal volume of the compressor 21.

Further, the refrigerant circuit 10 may be configured such that each of the total internal volume of the refrigerant pipes, the heat exchanger, and the like that are connected to the discharge side of the compressor 21 and the total internal volume of the refrigerant pipes, the heat exchanger, and the like that are connected to the suction side of the compressor 21 is greater than or equal to 0.7 times the internal volume of the compressor 21.

(9-4) Another Embodiment D

The foregoing embodiment has exemplarily illustrated the refrigerant circuit 10 in which the total internal volume of the refrigerant pipes, the heat exchanger, and the like that are connected to the discharge side of the compressor 21 is greater than or equal to 0.7 times the internal volume of the compressor 21.

In contrast, one or more refrigerant containers, such as receivers, may be provided on the discharge side of the compressor 21 so as to more easily secure a large total internal volume of the refrigerant pipes, the heat exchanger, and the like that are connected to the discharge side of the compressor 21. For example, the refrigerant circuit 10 may be provided with a refrigerant container(s) on a path between the discharge side of the compressor 21 and the expansion valve 24.

Further, one or more refrigerant containers, such as receivers, may be provided on the suction side of the compressor 21 so as to more easily secure a large total internal volume of the refrigerant pipes, the heat exchanger, and the like that are connected to the suction side of the compressor 21. For example, the refrigerant circuit 10 may be provided with a refrigerant container(s) on a path between the suction side of the compressor 21 and the expansion valve 24.

(9-5) Another Embodiment E

The foregoing embodiment has exemplarily illustrated the refrigeration cycle apparatus 1 including the refrigerant circuit 10 that can switch operation between the cooling operation and the heating operation.

In contrast, the refrigeration cycle apparatus 1 may include a refrigerant circuit specially designed for the cooling operation.

(9-6) Others

Note that the total internal volume of the refrigerant pipe and the component is preferably greater than or equal to 1.0 times, more preferably greater than or equal to 2.0 times, and further preferably greater than or equal to 5.0 times the internal volume of the compressor.

Note that 1,2-difluoroethylene may be trans-1,2-difluoroethylene [(E)-HFO-1132], cis-1,2-difluoroethylene [(Z)-HFO-1132], or a mixture of them. (Supplement)

Although the embodiments of the present disclosure have been described above, it is to be understood that various changes to the forms or details are possible without departing from the spirit or scope of the present disclosure recited in the claims.

REFERENCE SIGNS LIST

1 Refrigeration cycle apparatus
5 Gas-side refrigerant communication pipe (refrigerant pipe)
6 Liquid-side refrigerant communication pipe (refrigerant pipe)
10 Refrigerant circuit
10*a* Refrigerant circuit
11 First refrigerant pipe (refrigerant pipe)
12 Second refrigerant pipe (refrigerant pipe)
13 Third refrigerant pipe (refrigerant pipe)
14 Fourth refrigerant pipe (refrigerant pipe)
15 Fifth refrigerant pipe (refrigerant pipe)
18 Eighth refrigerant pipe (refrigerant pipe)
19 Ninth refrigerant pipe (refrigerant pipe)
21 Compressor
23 Outdoor heat exchanger (component)
24 Expansion valve (component)
31 Indoor heat exchanger (component)
41 Receiver (component)

CITATION LIST

Patent Literature

[Patent Literature 1] Japanese Patent Laid-Open No. 2019-196312

The invention claimed is:

1. A refrigeration cycle apparatus using as a refrigerant a composition comprising one or more compounds selected from the group consisting of ethylene-based fluoroolefins, 2,3,3,3-tetrafluoropropene, and 1,3,3,3-tetrafluoropropene, the refrigeration cycle apparatus comprising a refrigerant circuit including a compressor, a four-way switching valve, an outdoor heat exchanger, an indoor heat exchanger, a refrigerant pipe, and a component, wherein:

the four-way switching valve is a valve that switches the refrigerant circuit between a cooling connection state and a heating connection state, a total internal volume of a part of the refrigerant circuit from the discharge side of the compressor to the outdoor heat exchanger in the cooling connection state is greater than or equal to 0.7 times an internal volume of the compressor, and a total internal volume of a part of the refrigerant circuit from the discharge side of the compressor to the indoor heat exchanger in the heating connection state is greater than or equal to 0.7 times an internal volume of the compressor.

\* \* \* \* \*